INVENTOR.
L. D. Percival King

INVENTOR.
L. D. Percival King
BY

United States Patent Office 3,268,410
Patented August 23, 1966

3,268,410
RADIATION REACTOR
L. D. Percival King, Santa Fe, N. Mex., assignor to the United States of America as represented by the United States Atomic Energy Commission
Filed Oct. 16, 1963, Ser. No. 316,785
9 Claims. (Cl. 176—17)

The invention described herein was made in the course of, or under, contract W-7405-ENG-36 with the U.S. Atomic Energy Commission.

This invention relates to nuclear-powered reactors and, more particularly, to a reactor which uses radiation as the principal heat transfer mechanism between reactor core and heat exchanger.

Possible applications for a radiation reactor are as a highly efficient producer of heat energy which can be transformed into electrical power by well-known means, as a research tool to provide a high neutron flux source and very high temperatures simultaneously if so desired, and as a compact power plant for satellites or interplanetary vehicles.

Thermal energy can be transferred from one place to another by three principle means: conduction, convection, and radiation. Past nuclear reactors generally made use of either conduction or convection, or a combination of both, in order to extract power from the fissionable fuel. The radiation reactor of the present invention makes use of radiation as a principle method of energy extraction from the fuel to the heat exchanger. The essential requirement for making radiation an efficient process for energy transfer is a very high fuel surface temperature. Desirable temperatures are in the range of 2300° C. and 2800° C. and must be in excess of 2000° C.

The simplest design of a radiation reactor consists of a number of concentric cylinders with either a high temperature high flux cavity in the central region or a heat exchanger. Another design consists of three concentric graphite shells. The intermediate of these shells is the reactor core proper, while the shells on either side are the reflectors. The core shell or sleeve, as it is commonly called, is of two types: (1) a 10 to 15 cm. thick graphite cylinder impregnated on its inner and outer surfaces with a fissionable material to a depth of about 2 cm., or (2) a cylindrical container 1 to 2 cm. across for holding fissionable material. The fissionable material consists of uranium or plutonium oxide with a carbide such as zirconium carbide or plutonium and uranium oxide in a tungsten or tungsten alloy container. The two reflector shells are of graphite and the heat exchangers are contained within the two reflectors. These heat exchangers may consist of tubes within the graphite reflectors and could use either a gas or liquid coolant as the heat extraction medium. An essential feature of a radiation reactor is a space or gap between the core and the reflector shell which is filled with an inert gas such as helium so as to assist in the heat extraction from the fuel surfaces, reduce the evaporation of the fuel, protect the reflector surfaces from deposition of fission vapors and fragments, and most important, remove fission products from the reactor core region by continuously circulating the said gas.

It is, therefore, an objective of this invention to provide a reactor wherein the heat exchanger and other structural materials are eliminated from the fuel region, thus presenting a simplified reactor core area.

It is a further objective of this invention to provide a nuclear reactor that has a high rate of heat extraction from the fuel due to the efficiency of radiation process at temperatures exceeding 2000° C.

A still further objective of this invention is to provide a reactor design in which the heat exchanger surface is maximized so that conductive and convective processes can be more easily made available in the reflector rather than the fuel region.

Another objective of this invention is to provide a reactor whereby the removal of a large percentage of the fission fragments is accomplished by evaporation and diffusion and thus reduce the need for fuel reprocessing and in providing a reactor that has a high fuel burnout.

Another objective of this invention is to provide a very high temperature irradiation facility.

Other objectives and advantages of the present invention will become more apparent from the following description, including the drawings hereby made a part of the specification wherein.

Figure 1:
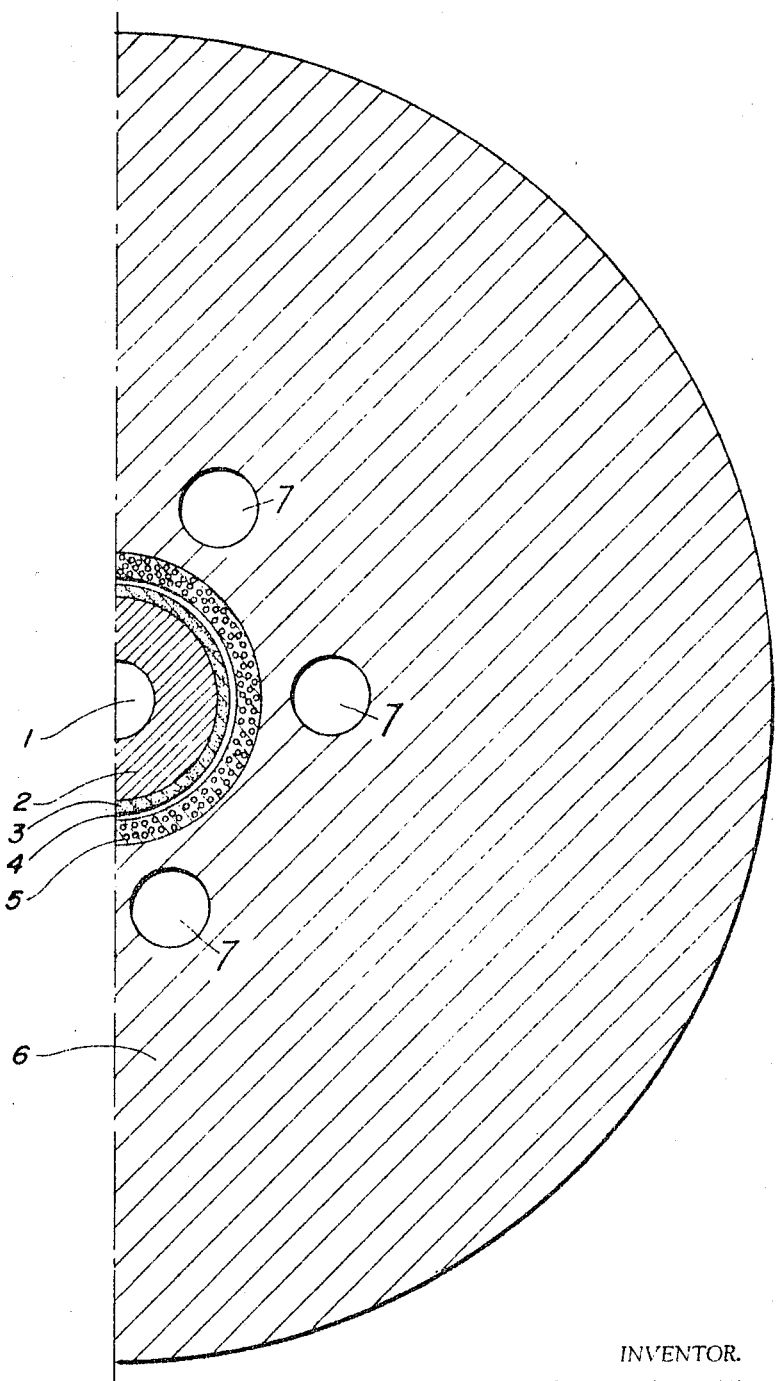
FIGURE 1 is a horizontal cross section view of one configuration of the reactor.

Referring first to FIGURE 1, the innermost region of the reactor is a cavity 1 which is used as a high flux and high temperature test area of the order of $4 \times 10^{12}$ neutrons/cc. and greater than 2700° C. Immediately adjacent to the cavity is a solid cylinder of graphite 2 whose outer rim is impregnated with a fissionable compound of uranium or plutonium 3 to a depth of about 2 cm. A graphite cylinder separated by a radiation gap or space 4 from the impregnated cylinder contains a heat exchanger 5 shown schematically as a number of tubes running through the said graphite cylinder. The outermost graphite shell 6 provides the remaining reflector and irradiation ports 7.

TABLE 1.—DESIGN CALCULATIONS FOR FIGURE 1 CYLINDRICAL TYPE REACTORS

| Region | Material | Radial Width (cm.) | Outer Radius (cm.) |
|---|---|---|---|
| 1 | Void (research cavity) | 5.0 | 5.0 |
| 2 | Graphite (1.6 g./cc.) | 15.0 | 20.0 |
| 3 | Graphite (1.6 g./cc.)+0.156 g./cc. oralloy (93.5% U-235 and 6.5% U-238). | 2.0 | 22.0 |
| 4 | Radiation gap (inert gas) | 1.2 | 23.20 |
| 5 | Graphite + coolant holes (average density 0.8 g./cc.). | 5.0 | 28.20 |
| 6 | Graphite reflector (1.6 g./cc.) and research cavities. | 100.0 | 128.20 |

Figure 2:
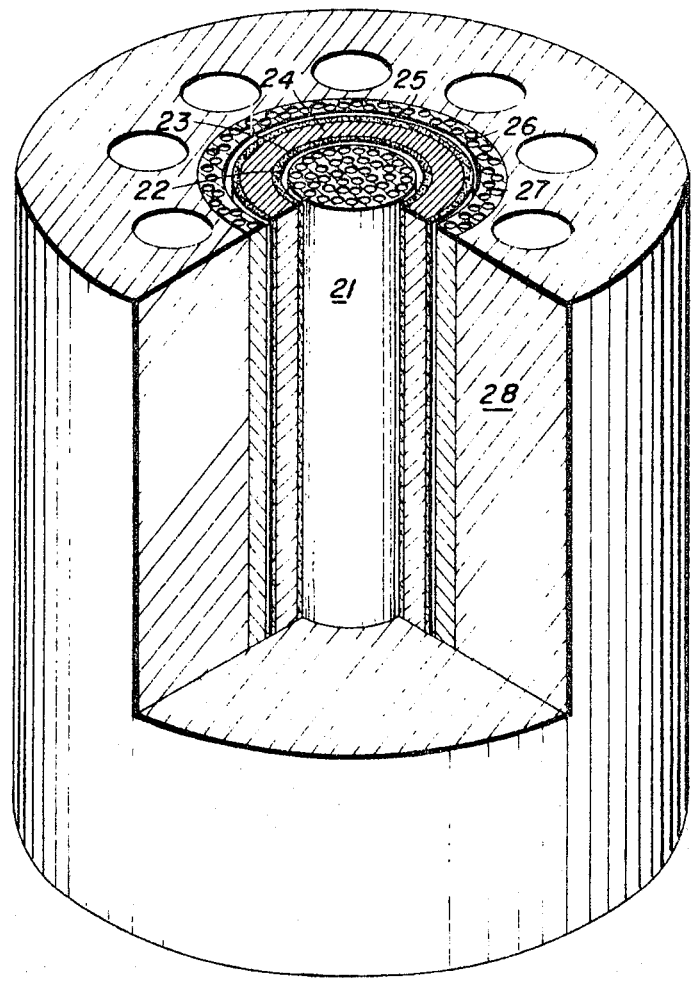
FIGURE 2 is a sectioned perspective of another embodiment showing in scale outside radius 62½ cm., length 250 cm. the internal components thereof.

FIGURE 2 has in place of the high flux cavity a heat exchanger. In addition there are two impregnated surfaces or sleeves of fissionable fuel material. In particular, the central core contains a heat exchanger embedded in a graphite cylinder 21. Radiation gap 22 separates the container of fissionable material 23, or the impregnated uranium or plutonium graphite cylinder 24 from the heat exchanger. Likewise an impregnated fissionable material or sleeve 25 on the graphite cylinder is separated from a second heat exchanger by space 26, said heat exchanger represented graphically by tubes located in a graphite matrix 27. This graphite cylinder is then surrounded by a reflector 28.

TABLE 2.—DESIGN CALCULATIONS FOR FIGURE 2 CYLINDRICAL TYPE REACTORS

| Region | Material | Radial Width, cm. | Outer Radius, cm. |
|---|---|---|---|
| 21 | Graphite plus heat exchanger (average density 0.8 g./cc.). | 12.80 | 12.80 |
| 22 | Gap containing an inert gas. | 1.20 | 14.0 |
| 23 | 0.78 g./cc. of oralloy in 1.6 g./cc. graphite. | 1.5 | 15.5 |
| 24 | Full density graphite (1.6 g./cc.). | 6.0 | 21.5 |
| 25 | 0.78 g./cc. of oralloy in 1.6 g./cc. graphite. | 1.5 | 23.0 |
| 26 | Gap containing an inert gas. | 1.20 | 24.20 |
| 27 | Graphite plus heat exchanger (average density 0.8 g./cc.). | 5.0 | 29.20 |
| 28 | Graphite (1.6 g./cc.) reflector and research cavities. | 100.0 | 129.20 |

The novel features of this invention are essentially that a 2300° K. surface temperature of a suitable fissionable fuel retains most of its uranium or plutonium content and makes use of radiation for a very efficient means of heat transfer. In fact, it has been found that 60 percent of the fission products would remain in an impregnated graphite at a temperature of 2600° C. This would assure adequate delayed neutron control. Iodine 135 escapes rapidly from the fuel layer, thus assuring a low xenon 135 concentration in the fuel region. The geometry of both FIGURES 1 and 2 provides for a temperature distribution in the core that is approximate symmetrically with a maximum temperature difference of 700° C. between the surface and the inner edge of the impregnated regions. Thus, using a 1000° K. heat exchanger temperature and a 2400° K. fuel surface temperature, a particular radiation reactor would produce 17 megawatts at a specific power of 305 watts per gram of fuel.

Fissionable compounds that are suitable as high temperature fuels include UC, $UC_2$, and carbides and oxides of plutonium. For either of the configurations of reactors as shown in FIGURES 1 and 2, about 7 kilograms of $Pu^{239}$ or $U^{235}$ is necessary to achieve a critical mass. The use of Pu or U carbide fuels permits a large portion of the fission products to volatilize and thus escape from the fuel layer into the radiation gap formed between the core and the graphite reflector, thus essentially eliminating the need for constant fuel reprocessing.

As a modification of the present invention $U^{238}$ can be added to the graphite in the reflector region of the reactor so as to provide a breeding zone for the formation of $Pu^{239}$. This, in effect, would give one a self sustaining reactor burning mostly $U^{238}$.

It is, therefore, apparent that the present invention provides a novel arrangement and association of parts which results in a nuclear reactor having numerous advantages over prior art devices. While presently preferred embodiments of the invention have been described, it is clear that many other modifications may be made without departing from the scope of the invention. For example, more complicated lattice or cylinder arrangements may be more efficient or suitable for large power installation. Therefore, the present invention is not limited by the foregoing description, but solely by the appended claims.

What is claimed is:
1. A nuclear reactor operating at a temperature in excess of 2000° C. to permit energy extraction by radiation, comprising a cylindrical core portion, said core being a dense graphite cylinder whose outer rim contains fissile material to a depth of about 1.5 cm. and in the concentration of 0.156 gm. of fissile material per cubic centimeter of graphite, said fissile material being selected from the class consisting of the carbides and oxides of uranium and plutonium, a cylindrical reflector portion surrounding the said core portion and consisting of a high temperature material and containing both heat exchanger and research cavities, and said reflector being spaced from the said core portion.

2. The nuclear reactor of claim 1 in which there is a space of about 1.2 cm. between the said core portion and the said reflector portion, said reflector containing the heat exchanger.

3. The nuclear reactor of claim 1 in which said core portion consists of a dense graphite cylinder whose outer rim is impregnated with a fissionable compound, said compound being selected from the class consisting of carbides of uranium and plutonium.

4. The nuclear reactor of claim 1 in which an inert gas is continuously circulated in the space formed by the separation of the core and reflector portions.

5. The nuclear reactor of claim 1 in which said core portion is composed of uranium carbide and graphite and said core surface temperature is about 2400° C.

6. The nuclear reactor of claim 1 in which said core portion consists of a dense graphite cylinder whose outer and inner surfaces is impregnated to a depth of about 1.5 cm. with a fissionable compound, said compound being selected from the class consisting of carbides of uranium and plutonium.

7. The nuclear reactor of claim 1 in which there are two heat exchangers, one in the most central portion of the reactor and a second heat exchanger adjacent to but separated from the outer surface of the impregnated core.

8. The nuclear reactor of claim 1 in which the reflector portion contains research cavities in which specimens can be subjected to a high neutron flux and to temperatures in excess of 2000° C.

9. A method of extracting energy from a nuclear reactor as claimed in claim 1 comprising operating the reactor at a temperature in the range of 2000° C.–2700° C. at the core surface and having a heat exchanger spaced from said core and operating at a temperature of about 1000° C.

References Cited by the Examiner
UNITED STATES PATENTS

| | | | |
|---|---|---|---|
| 2,828,875 | 4/1958 | Ginns | 176—17 X |
| 2,953,510 | 9/1960 | Anderson | 176—18 X |
| 2,990,351 | 6/1961 | Sanz et al. | 176—82 X |
| 3,150,054 | 9/1964 | Fox | 176—39 X |
| 3,160,568 | 12/1964 | MacFarlane | 176—40 X |

FOREIGN PATENTS 812,544    4/1959    Great Britain.

REUBEN EPSTEIN, *Primary Examiner.*